Oct. 9, 1962 W. L. POLAND 3,058,097

INFORMATION HANDLING SYSTEM

Filed March 1, 1955 4 Sheets-Sheet 1

*INVENTOR.*
WILLIAM L. POLAND.
*BY* William R. Sherman
HIS ATTORNEY.

Oct. 9, 1962 W. L. POLAND 3,058,097

INFORMATION HANDLING SYSTEM

Filed March 1, 1955 4 Sheets-Sheet 2

INVENTOR.
WILLIAM L. POLAND.
BY William R. Sherman
HIS ATTORNEY.

Oct. 9, 1962 W. L. POLAND 3,058,097

INFORMATION HANDLING SYSTEM

Filed March 1, 1955

4 Sheets-Sheet 3

INVENTOR.
WILLIAM L. POLAND.

BY William R. Sherman

HIS ATTORNEY.

Oct. 9, 1962 W. L. POLAND 3,058,097
INFORMATION HANDLING SYSTEM
Filed March 1, 1955 4 Sheets-Sheet 4

INVENTOR.
WILLIAM L. POLAND.
BY William R. Sherman
HIS ATTORNEY.

United States Patent Office 3,058,097

Patented Oct. 9, 1962

3,058,097

INFORMATION HANDLING SYSTEM

William L. Poland, Bethel, Conn., assignor, by mesne assignments, to Schlumberger Well Surveying Corporation, Houston, Tex., a corporation of Texas Filed Mar. 1, 1955, Ser. No. 491,281
23 Claims. (Cl. 340—174)

This invention relates to information handling systems and, more particularly, to systems employing an array of switching elements for reading perforated cards.

A variety of electrical computing, control and memory systems require speedy access to one or more fixed blocks of information, such as programs of operational orders or function tables. In many such systems, information is entered one bit or a few bits at a time, rather than in a block. In some systems, bits of information in the block are accessible only by periodic scanning or slow speed addressing, and not by high speed addressing. Substantial advantages may be realized in combining block entry of information and high speed selective addressing, and further providing a convenient external processing and storage of the information blocks.

These advantages are partially realized by a type of static card reader which is adapted for selective block reading of an externally processed, punched or perforated card. Pins employed by this reader are urged through card perforations to close associated sets of electrical contacts. Selective adressing is provided by diodes interconnected with the contacts in a switching array. For a commercial punched card with 540 spaces, 540 sets of contacts and the same order of diodes are required. That this form of static memory has not had more widespread application may be attributed to its disadvantages of bulkiness, cost and low reliability, where low reliability arises from the substantial probability of equipment failure attending use of so many diodes and contact sets.

Accordingly, it is an object of the present invention to provide new and improved methods and means for block handling of information with high reliability whereby the above-recited advantages in storage, entry and selection are secured.

Another object of this invention is to provide novel methods and means for reading information from a perforated medium such as a punched card, especially where the card remains static to enable random readout.

Another object of this invention is to provide for the generation of functional relationships between a plurality of input values and a dependent output value.

Yet another object of this invention is to provide novel and improved methods and means for extracting information from an array of magnetic cores.

A further object of this invention is to provide novel methods and means for representing information in binary form.

Yet a further object of this invention is to provide a rugged information storing matrix which may readily be constructed to possess a high degree of reliability.

These and other objects of the invention are attained by fixing magnetic cores in an array at one of two values of a magnetic property, such as permeability or retentivity, in accordance with the information handled, and selectively addressing said cores by inductive energization to derive an indication of their binary state. To fix the property at one of two values, cores of generally U-shaped form are associated with keepers which may either be seated or off. Windings are inductively coupled by the cores for selective energization to derive a readout signal dependent in magnitude upon the keepered or unkeepered state of the selected core. The state of the cores is conveniently fixed by interposing a perforated card between cores and keepers so that only those cores registering with perforations are keepered.

In one embodiment, a matrix of cores grouped as word units in rows and columns are coupled together by row windings and column windings. When an interrogating pulse is applied to one row winding, the column windings corresponding to a selected word unit in the row are gated to pass output signals representing the binary value of the word. In another embodiment, cores in a row are turned over from one state N of residual magnetism to another P by a selecting signal. An interrogating signal is thereafter applied to a winding coupling together cores in a columnar group of word units to turn over the cores of the word unit in the selected row from P to N. The resultant change of magnetic flux in the cores of the selected word unit produces on output windings coupled therewith a signal dependent in value upon whether the cores are keepered or not.

The invention, together with others of its objects and advantages, will be better perceived from the following detailed description taken in conjunction with the drawings, in which.

Throughout the figures, like reference numerals are employed to designate similar parts.

Figure 1:
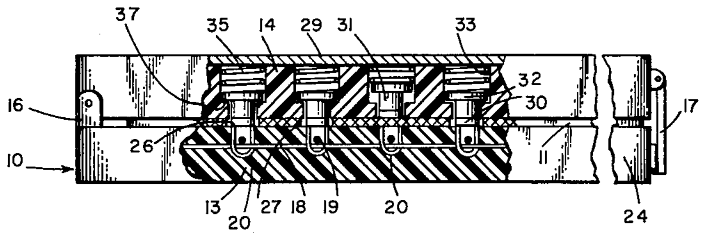
FIG. 1 is a side elevational view of a card reading box with a portion cut away.

In FIG. 1, a card reading box 10 is shown with a perforated or punched card 11 clamped between a base portion 13 and cover portion 14 of the box. Along one edge the base and cover portions 13, 14 are pivotally connected by a hinge 16 and at their opposite edges a latch 17 is provided for securing the portions firmly upon a card received therebetween.

Figure 2:
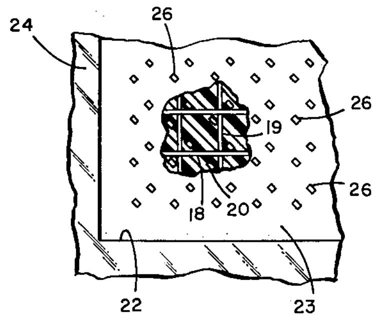
FIG. 2 is a fragmentary plan view of the base portion of the box shown in FIG. 1, with a portion cut away.
Figure 3:
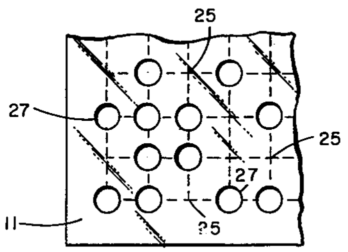
FIG. 3 is a fragmentary plan view of a punched card suitably employed in this invention.

The base portion 13 conveniently has the form of a block of non-magnetic insulating material such as a plastic molded to encapsulate single-turn row and column windings 18 and 19, respectively, interlacing U-shaped magnetic cores 20. The U-shaped cores 20 are arranged, as seen in FIG. 2, in a two-coordinate matrix of rows and columns, each core being inclined at approximately a 45° angle to the line of the rows and columns. The cores 20 are, furthermore, spaced from the edges 22 of a recess 23 formed in the upper face 24 of the base portion so as to be in registery with the spaces or positions 25 at the row and column intersections of the perforated card 11 (FIG. 3) when such card is received in the recess.

As may be seen in FIG. 1, the recess 23 defined by the edges 22 is not equal in depth to the thickness of the card 11. The upper free ends 26 of the U-shaped cores 20 are exposed in the recess over a region smaller in area than a registering perforation 27 of the punched card 11. As a result, with the card 11 positioned in the recess 23, the free ends 26 of all those cores registering with perforations 27 will be exposed or accessible through such perforations. Conveniently, the perforations 27 may be circular and of a diameter conforming to a standard type of punched card. As a suitable type of punched card carries 90 columns each with 6 rows, arranged in superposed groups of 45 columns each, the rows and columns of cores 20 may be similarly arranged. The cores may, of course, be arranged for registery with the perforations of any other standard punch card or other perforated member. Moreover, they may be inclined in alternate directions rather than similar directions as shown.

In the cutaway portions of FIGS. 1 and 2, the row and column windings 18, 19 are seen to have the form of straight wire conductors making a single turn coupling with each core in the corresponding row or column. While multiple turn series windings may be employed, if desired, single turn windings 18 and 19 facilitate a speedy and economical manufacture. Thus, in one mode of manufacture, the conductors 18 and 19 are first arrayed in a rectangular grid work overlying a mold for the face 24, and the cores 20 are positioned at the crossover points. With a mating mold in place, plastic is injected to set about the windings and cores. The free ends 26 of the cores may then be ground smooth and flush with the bottom of recess 23, yielding an exceedingly durable and stable construction.

The cover portion 14 may also be formed as a molded plastic with a separate retainer plate 29 secured across its top. The plate 29 serves to retain disk-like magnetic keepers 30 carried on flanged rod-like elements 31 within cylindrical bores 33 formed in the cover portion 14. The elements 31 and the keepers 30 carried thereby are fitted in the bores 33 for sliding movement which permits the keeper to pass through card perforations 27 for seating on the free ends 26 of the U-shaped cores 20. Urging the keepers into seating position are springs 35 fitted within the bores 33 and acting in compression between the retaining plate 29 and the flanged heads 32 of the rod-like elements 31. As the portion of each bore receiving the spring 35 and the flanged head 32 is larger than the lower portion through which the element 31 and keeper 30 extend, a shoulder 37 is provided in each bore for engaging the flanged head whenever the cover portion 14 is in raised position, thereby to prevent loss of the keepers and elements carrying them. It desired, however, one or more of the keepers may be removed after removing the retaining plate 29 to preclude keepering of the associated core or cores. It may be observed that removal of a keeper prevents sensing a perforation at the corresponding card space.

The punched card 11 determines by its pattern of perforations 27 which of the keepers 30 will seat on the ends 26 of the registering U-shaped cores 20, thereby to complete the magnetic circuit for the core in materials of relatively high magnetic permeability. While two air gaps will effectively be included in the magnetic circuit even when the keeper is seated on the core, these air gaps each will be less than 0.001 inch in effective length where normal care is given in smoothing the seating surfaces for conformance to one another. With the keeper unseated as by interposition of the card 11, however, a sizable air gap having an effective length double the thickness of the card will be created. The physical position of the keeper relative to the U-shaped core then represents the "staticized" intelligence stored or held in memory by the card reading box 10 and derived from the perforation pattern of the card.

Figure 4A:
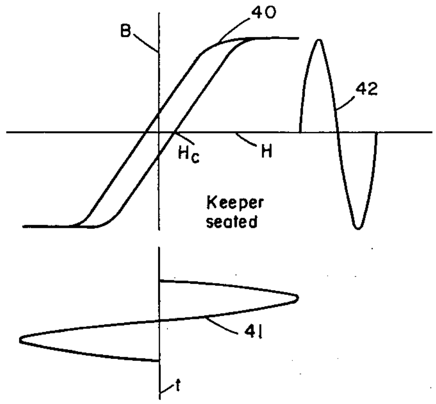
FIGS. 4A and 4B are graphic illustrations of the magnetic characteristics of a core with keeper on and keeper off, respectively.
Figure 4B:
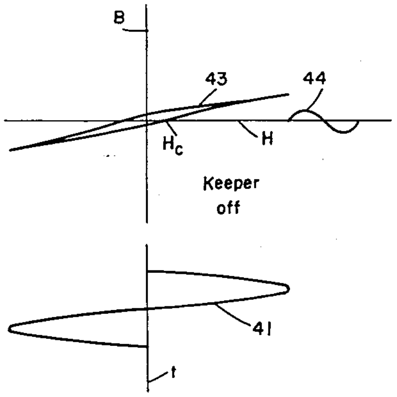

To extract this intelligence or information selectively from one or more cores of the memory, the B-H characteristics of each core with and without the keeper seated must be sufficiently different to permit discrimination between the keepered and unkeepered states. In one form of the invention, a B-H characteristic shown in FIGS. 4A and 4B permits a convenient discrimination between these two states. This B-H characteristic shown in FIG. 4A represents the composite characteristic for the core and seated keeper taking account of the effective air gaps in the seating plane. Suitably both the core and keeper might be made of the same magnetic material having a generally rectangular hysteresis loop 40 with a relatively low coercivity $H_c$. Desirably, the material also has a relatively high retentivity. As seen by a comparison of FIGS. 4A and 4B, the basis for discrimination between the conditions of keeper seated and keeper off is the substantial difference in permeability indicated by the slopes of the B-H characteristics for the two states. A great variety of magnetic materials have a B-H characteristic which affords a substantially higher permeability with keeper seated than with keeper off. If desired, the keeper may be composed of a magnetic material having a higher permeability than the material of the U-shaped core 20 in order to accentuate the difference in permeabilities for the two states.

To detect the difference in permeabilities, an interrogating pulse is applied to one winding coupled with a core to induce a pulse on the transverse winding coupled with the same core. Applying a single cycle sine wave pulse 41 to a row winding 18, for example, produces a large read-out pulse 42 on a column winding 19 coupled with a selected core having its keeper seated. The pulse 41 supplies a magnetomotive force to drive the keeper and core around their B-H hysteresis loop 40. With the keeper off or spaced from the U-shaped core, on the other hand, a hysteresis loop 43 representing the consequent low permeability results in a very weak pulse signal 44 on the column winding 19.

Figure 5:
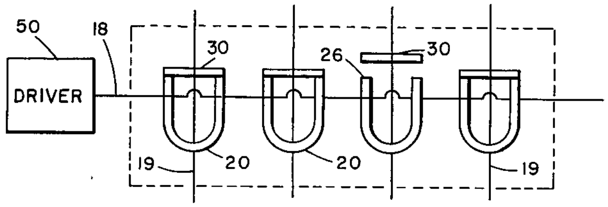
FIG. 5 is a schematic diagram of cores arranged to represent a single binary word.

While the selective interrogation of a single core to determine its state would provide information of utility for a wide variety of applications, such as the energization of a contactor type servo control system in accordance with two input parameters, a wider utility is achieved by arranging the system of this invention for generating a binary word in response to an interrogating signal. A binary word will be understood to comprise two or more binary digits in a group. Where the number of digits employed is $n$, such word may have $2^n$ unique binary values. A binary word of relatively few digit places can, therefore, convey a very appreciable amount of information. FIG. 5 shows the manner in which cores may be grouped to represent a binary word of four digit places. All of the cores 20 except that which represents the third place digit have their keepers 30 seated to complete a relatively high permeability magnetic circuit. As the outputs from the first, second and fourth place cores are substantially greater than the output from the third place core, the matrix word unit illustrated in FIG. 5 may be taken to represent the binary number 1011 in the classical binary code. This binary number represents $2^3$ plus $2^1$ plus $2^0$, or eleven in decimal notation.

Associated with the row winding 18 which links each of the cores of the word unit is a driver 50. This driver is a pulse type current source and, accordingly, may have any one of a variety of well known forms. For example, it may comprise a magnetic switch drive or a triggered gas tube inductively coupled to the row winding 18. Preferably, it provides a pulse wave form of the type shown as curve 41 in FIGS. 4A and 4B. In the manner discussed above, energization of the driver 50 produces read-out pulses on the column windings 19 which differ substantially in magnitude in accordance with whether or not the keeper 30 of a particular core 20 is seated.

Figure 6:
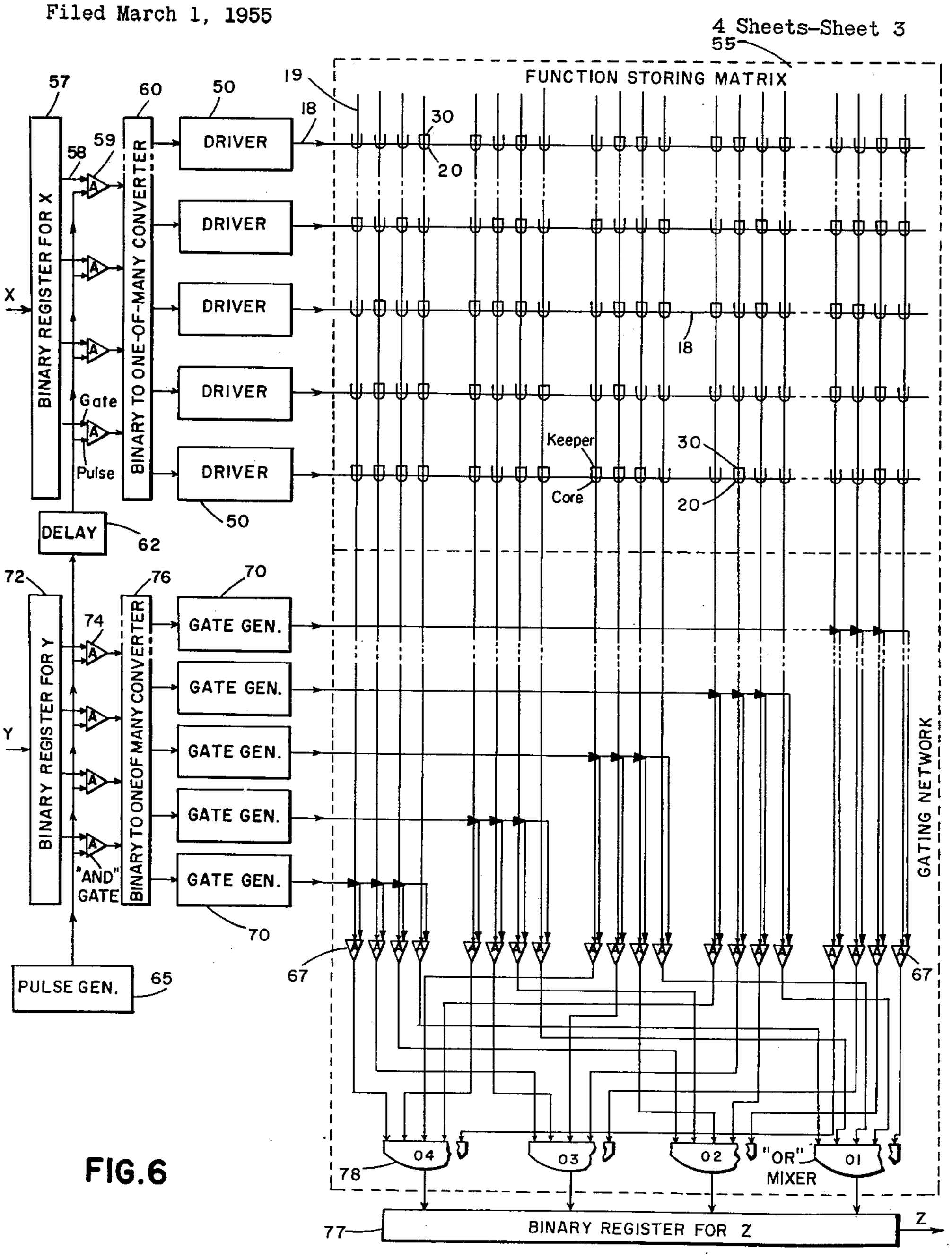
FIG. 6 is a schematic diagram of an information handling system in accordance with this invention.

In FIG. 6 there is shown an information handling system in accordance with the invention which serves to generate a function $z$ of two variables, designated $x$ and $y$, that is, to locate a value in a two-coordinate matrix. Each independent variable is expressed as a binary word, as is the dependent variable $z$. It will be appreciated, of course, that there is no limitation upon the digit places of any of the variables, as a competent designer may alter the system in accordance with the principles of this invention to accommodate whatever number of digit places is desired. To accommodate four digit places for each of the variables, the system of FIG. 6 employs a function storing matrix 55 having sixteen rows and sixteen columns of word units. In each word unit are four cores 20, shown as U symbols, with their associated keepers 30 seated or not as determined by the pattern of card perforations. Row winding 18 are threaded through each of the cores of the corresponding row to couple the same to the associated driver 50.

Representing the input for the variable $x$ is a binary register 57 having parallel output conductors 58 for each digit plate of $x$, namely, four. Binary register 57 may, for example, be of the type employing bistable multivibrators arranged for binary counting and having paralleled output connections from the plates of their output tubes. The paralleled output conductors 58 from the binary register 57 connect through a set of "and" or coincidence units 59 to a converter 60. The coincidence units 59 have the function of producing an output signal whenever signals are applied coincidentally at each of their respective inputs. As is well known, they may be realized with diode circuitry, multiple grid tubes, or a variety of other circuit arrangements. Each of the coincidence units 59 has an input connected in common through a delay 62 to a pulse generator 65.

The outputs of the coincidence units 59 are applied in parallel to converter 60 which may have the form of a relay tree, a diode selection matrix, or a magnetic core selection arrangement in a variety of well known fashions. The converter 60 functions to energize one of the sixteen drivers 50 in accordance with the binary value of its input. Following the legend on FIG. 6, arrowheads applied to the lines diagrammatically illustrating electrical connections differentiate gate signals from pulse signals and further indicate the direction of signal flow. For convenience, current return conductors are not shown.

The column conductors 19 are each threaded through a column of cores representing a given digit place in a column of word units. Thus, the column conductors are grouped in sets of four corresponding to the grouping of the cores in columns of word units. The column conductors 19 of each group are connected to the inputs of a corresponding set of coincidence units 67. The coincidence units 67 of each set have an input connection in common to one of sixteen gate generators 70. As is known, gate generators are conventional computer elements for producing an output gate pulse (that is, a rectangular shaped pulse of substantial time duration) each time that an input pulse is applied. The gate generators 70 may conveniently be monostable multivibrators, for example.

To provide for the selective energization of one of the gate generators 70 in accordance with the binary value of the variable $y$, this variable is supplied to a binary register 72, similar to the binary register 57 for the variable $x$. The paralleled output of the register 72 is supplied through coincidence units 74 to a binary to one-of-many converters 76, in correspondence to the connection of register 57 through coincidence units 59 to the converter 60. The second input of each of the coincidence units 74 is connected directly to the pulse generator 65. As was true of the converter 60, the converter 76, when energized from the binary register 72, selectively energizes that one of the gate generators 70 which corresponds in decimal value to the binary value of the variable $y$.

To couple the sets of column conductors 19 to a binary register 77 for the output variable $z$ in proper digit order, all of the outputs from the coincidence units 67 carrying the first place digit are coupled to a first "or" or mixing unit 78 designated 01. Similar mixing units 02, 03 and 04 are coupled respectively to the second, third and fourth place outputs of the coincidence units 67. These mixing units 78 produce an output signal whenever any of their respective inputs are energized. In a well known fashion, they are commonly implemented with diode circuitry. Each mixing unit has a single output representing one of the digit orders which are coupled to the binary register 77 for entering the binary values for the four digit places of the word giving the value of the variable $z$.

In operation, binary values of the input variables $x$ and $y$ are entered in the registers 57 and 72, respectively. At an appropriate instant, a pulse is supplied from the pulse generator 65 which is immediately gated through each of the coincidence units 74 to which the binary register has supplied a "one" gate. Output pulses are thereby derived from the coincidence units 74 for application to the converter 76 in accordance with the binary value of the variable $y$. The converter then energizes one of the sixteen gate generators, generally that one in decimal notation which corresponds to the value of the $y$ variable in binary notation. For example, if the binary value of the variable $y$ was 0100, the fourth gate generator in decimal order would be energized. That gate generator 70 would then supply a gate signal to the fourth set of coincidence units 67.

After an interval determined by the delay 62 the binary value entered in the register 57 representing the variable $x$ is gated through the coincidence units 59 to the converter 60 in the same manner as with the variable $y$. Again, the converter 60 selects the driver 50 corresponding to variable $x$ to energize the corresponding row winding 18. If the variable $x$ is 1101, the thirteenth row winding is thereby energized to interrogate the cores grouped as word units in the thirteenth row. By the previous selection of the fourth gate generator, the output of the word units in all columns except the fourth are ignored. Effectively then only the word unit in the thirteenth row of the fourth column is interrogated. Pulses are produced on the column windings 19 of this selected word unit in accordance with the pattern of keepered and unkeepered cores. If the second and third keeper are closed, as illustrated, pulses of appreciable magnitude will be applied only to the column conductors threading the second and third cores of this selected word unit. These pulses are gated through the fourth set of coincidence units 67 to the mixing units 02 and 03, respectively. This pattern of pulses is then applied to the binary register 77 to represent the derived value of the dependent variable $z$.

Not only do the coincidence units 67 serve to discriminate against pulses applied on the non-selected column windings, but also they serve to discriminate against relatively weak pulses applied to selected or gated column windings passing through unkeepered cores. For this discrimination, it is necessary that the material of the keepers and cores provide an appreciable amplitude difference between the pulses 41 and 44 (FIGS. 4A and 4B) derived, respectively, from the keepered and unkeepered cores.

Of great importance is the fact that the information such as the function of two variables stored in the matrix 55 may quickly be changed where the matrix has the physical form of the card reading box 10. Thus, it becomes only necessary to open the box and replace the punched card 11 with another having a different pattern of perforations. If card reading is not desired, information could be set into the matrix 55 by removing keepers at points in the matrix which are to have the value zero. The matrix 55 could, on the other hand, be constructed with provision made for placing cores at the crossover points of the column and row windings selectively in any desired pattern.

Where the binary registers 57 and 72 have the form of counters, they may be stepped through successive values of $x$ and $y$ to scan the matrix in any desired order.

Rather than gating the $x$ variable into the converter 60 at an interval determined by delay 62 following gating of the $y$ variable into the converter 76, application of the $x$ and $y$ variables to a single binary register might be programmed in sequence with selective gating to the converters 60 and 76.

Figure 7A:
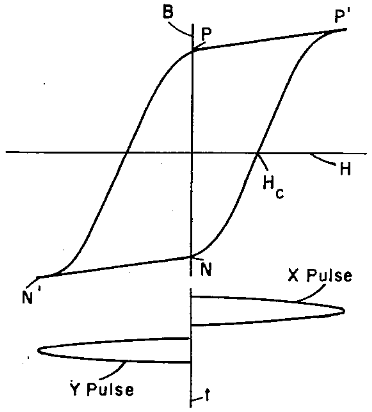
FIGS. 7A and 7B are graphic illustrations of magnetic characteristics for keepered and unkeepered cores, respectively, which are suited for use in another embodiment of this invention.
Figure 7B:
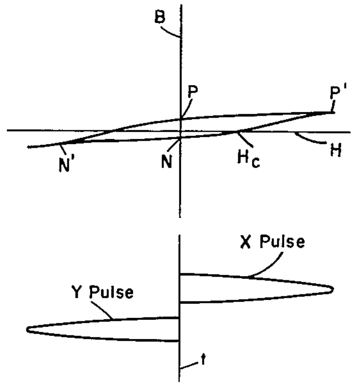
Figure 8:
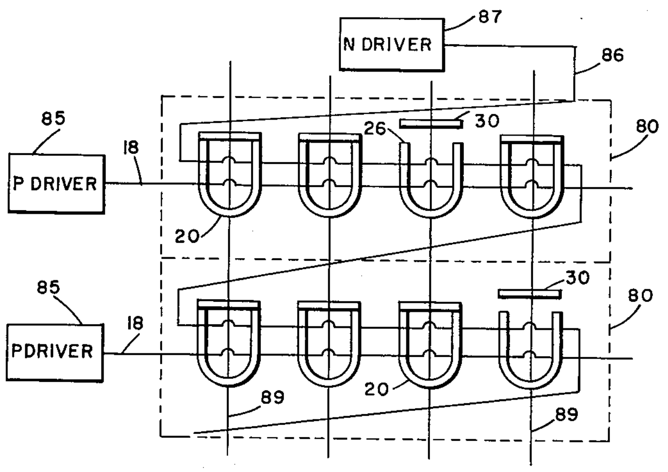
FIG. 8 is a schematic diagram similar to FIG. 5 showing a pair of word units associated with drivers utilizing the characteristics illustrated in FIGS. 7A and 7B.

These and other modifications of the system of FIG. 6 may be made without departure from the inventive principles exemplified. In any event, the manner of storing and reading out information from the matrix 55 remains both dependable and versatile.

Where the cores and keepers are of a composition which provides a generally rectangular hysteresis loop characteristic with relatively high coercivity, another mode of interrogating selected cores or word units may be employed. This mode, illustrated in FIG. 8, is based upon a differentiation between keepered and unkeepered cores in accordance with their retentivity. Assuming that all of the cores originally have a remanence or residual magnetism designated N on the B-H characteristic (FIGS. 7A and 7B), a row generally including both keepered and unkeepered cores is turned over by a magnetomotive driving force from N to P, that is from negative to positive remanence. Thereafter the selected column of word units is driven toward negative remanence by an N going interrogating pulse. Since all of the cores were originally at the state N, only the cores of the word unit at the intersection of the selected row and column will be turned over from P to N. As is evident by a comparison of FIGS. 7A and 7B, the flux change from P to N for the keepered core is substantially greater than that for the unkeepered core. Read-out windings threading the respective selected cores, therefore, will have pulses induced thereon differing in magnitude in accordance with the status of the keepers so that the binary value of the selected word unit may be derived.

In FIG. 8 is shown one mode of utilizing the different retentivity of keepered and unkeepered cores to store information which may be read out as a binary word. The upper unit 80 may represent, for example, the word 1011 and the lower unit, the word 0111. Threading the cores 20 of each word unit is row winding 18 connecting with a driver 85 designed to provide positive going pulses for turning over the cores in the associated row from N to P. Threaded through the cores of the word units 80 in succession is a zig-zagged interrogating winding 86 coupled to a driver 87 differing from the driver 85 in providing pulses of opposite polarity. Thus, the driver 87 is designed to provide negative going pulses to drive all of the cores in the column of word units toward N. In order that the plurality of the flux change induced by a negative pulse in the windings 86 may be opposite to that induced by a positive pulse in windings 18, these windings 86, 18 traverse the cores in the same direction to have the same winding polarity. If desired, the winding polarities might be opposite and the pulse polarities the same to derive opposite magnetomotive forces. Read-out windings 89 paralleled in a set, one for each digit place of the word units, traverse respective cores of the word units 80 having the same digit place.

As will be apparent from the preceding description of the magnetic characteristics for the keepered and unkeepered cores (FIGS. 7A and 7B), an N going pulse from the driver 87 following a P going pulse from the driver 85 will produce pulses on windings 89 differentiated in magnitude in accordance with the unkeepered and keepered states of the cores in the selected word unit.

Utilizing word units 80 arranged as shown in FIG. 8 is an information handling system (FIG. 9) which further exemplifies the principles of this invention. Here the binary value of the variable $x$ is applied to binary register 57 having parallel output conductors 58. The registered value is coupled by conductors 58 through coincidence units 59 to the converter 60. Connected to the output of the converter 60 are sixteen drivers 86 each coupled to a corresponding row winding 18. The row windings, in turn, thread cores of word units in the associated rows forming a function storing matrix 90. In this embodiment of the invention, the coincidence units 59 each have a second input connected in common directly to the pulse generator 65.

The binary register 72 for the $y$ variable is coupled through the set of coincidence units 74 to the converter 76, as was the case in FIG. 6. Each of the coincidence units 74 has a second input connected in common to the pulse generator 65 through a delay 91. To facilitate restoration of the cores of the matrix to the N stage, connection is made from the converter 76 to the sixteen drivers 87 through mixing units 92, one for each driver. The drivers 87, when energized, are designed to supply a unidirectional pulse to the associated column winding 86. This winding 86 threads through the cores 20 of word units 80 arranged in a given column in a zigzag pattern preserving the same polarity relationship with respect to each core. The readout windings 89, one for each digit place, run in the columnar direction through the cores of columnar word groups, one word group column after the next. The read-out windings 89, in order to preserve identity of polarity relationships with each core, likewise follow a zigzag path through the matrix. So that readout winding signals occurring during an N to P turnover or a restoration of all cores to N may be ignored, windings 89 are coupled through a set of coincidence units 95 to the binary register 77 from the $z$ output variable may be extracted. These coincidence units 95 each have a second input connected in common to a gate generator 96 energized through delay 91 by the pulse generator 65.

To effect restoration of the cores of the matrix to their N state, each of the mixing units 92 has an input connected in common through a delay 97 and the delay 91 to the pulse generator 65. The delay 97 provides a time interval between the applictaion of pulses to the coincidence units 74, 95 and to the mixing units 92 permitting readout of the $z$ variable into the register 77 before restoration of the matrix cores to their N state.

In operation, $x$ and $y$ variables are entered in the registers 57, 72 in binary form. A pulse is derived from the pulse generator 65 which is immediately gated through the coincidence units 59 in accordance with the pattern of binary "ones" in the $x$ variable. If it be assumed that the $x$ variable is 1101, for example, a pulse from the pulse generator 65 would be gated only through the first, second and fourth coincidence units 59 into the converter 60. As the binary number 1101 corresponds to the decimal number thirteen, the converter will energize the thirteenth driver 85 and, therefore, the thirteenth row winding to turn over the cores in that row from N to P. After this operation is completed, the pulse from the pulse generator 65 delayed in the delay unit 91 causes entry of pulses into the converter 76. These pulses correspond to the pattern of "ones" in the $y$ variable entered in the register 72. Assuming this value to be 0010, for example, a pulse will be applied to the converter 76 only through the second coincidence unit 74. As the value of the decimal equivalent to 0010 is two, the second mixing unit 92 will carry a pulse to the associated driver 87 energizing the second column winding 86 to turn over the cores in the selected thirteenth word unit of the second column from P to N. Since all of the cores for word units other than that in the thirteenth row were already in the N state, they are substantially unaffected by the pulse on the column winding 86 and make no appreciable contribution of signal on the read-out windings 89.

Accordingly, the paralleled read-out windings 89 will carry pulses differentiated in magnitude in dependence upon the pattern of keepered and unkeepered cores in the selected word unit. Thus, sizable pulses would be induced only on the second and third read-out windings. As the pulse delivered from the delay 91 operates upon the gate generator 96 to produce a gate contemporaneously with the production of pulses on the read-out windings 89, the read-out pulses will be gated through the coincidence units 95 to the binary register 77.

At an interval after readout of the *z* variable, the pulse from the delay 91 will pass also through the delay 97 and through the mixing units 92 to each of the sixteen drivers 87. Each of the cores of the matrix, particularly those in non-selected word units of the selected row, will thus be restored to the N state preparatory to the commencement of another interrogation cycle.

If desired, the pulse generator 65 may be of the type known as a clock providing a train of time-spaced pulses. The time spacing would permit a complete readout or interrogation cycle in each pulse interval. The pulses provided by the drivers 85 and 87, it may be noted, are of no critical value, except that they are sufficient to turn over the associated cores from one state to another. Rectangularity of the hysteresis loop for the core and keeper materials is therefore not critical to discrimination of the read-out signals by the coincidence units 95 but rather an incident to the relatively high retentivity of the keepered cores which is the basis of core selection and pulse discrimination.

Figure 9:
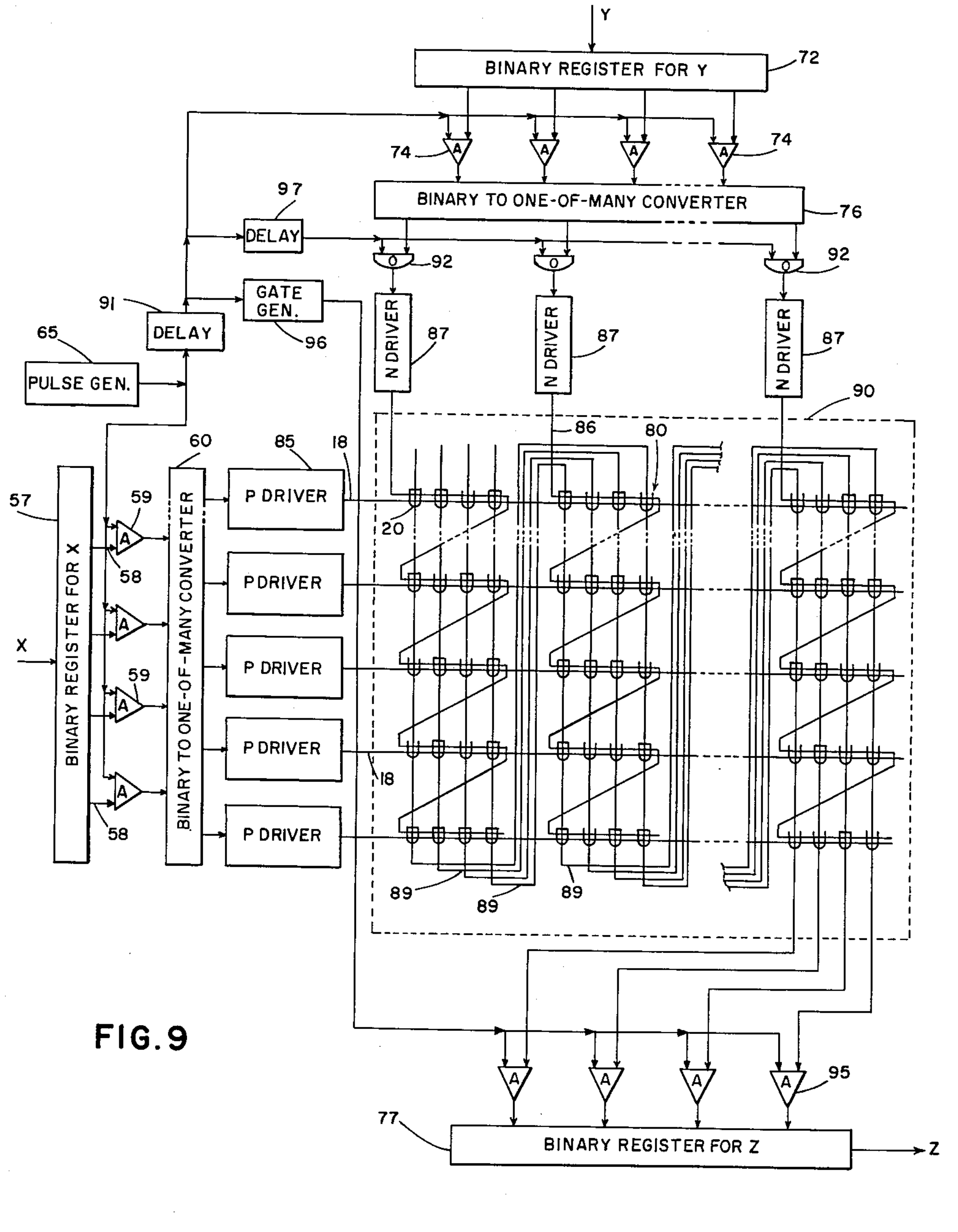
FIG. 9 is a schematic diagram of an information handling system employing word units as shown in FIG. 8.

The system of FIG. 9 is subject to various modifications without departure from the principles of this invention. For example, in view of the delay between energization of a selected P driver 85 and a selected N driver 87, a single binary register and converter might be used on a time sharing basis for selecting first a P driver and then an N driver. If desired, the N drivers could be energized in sequence to drive successive columns of word units toward the N state. In this instance, the read-out windings would be gated to the binary register 77 when the N driver corresponding to the binary value of the variable *y* was energized.

The versatility of the systems disclosed is evident from the fact that the information stored in the cores may be altered simply by changing the positions of the keepers. The apparatus of FIGS. 1–3 affords ready means for effecting such a change, namely, by a simple change of punch cards in the card reading box 10. Keyboard setting of the keepers might also be employed. As rugged and reliable versions of the components utilized for driving and selecting the cores of the matrix are well known, it will be evident that this invention provides for an extremely versatile and reliable information handling system. Where card reading boxes are utilized in the matrices, these card reading boxes may be of any convenient size, such as a size accommodating standard punch cards, and may be grouped together to provide word units, and rows and columns of as high an order as desired, or a three dimensional matrix.

The modifications described and others falling within the true scope and spirit of the invention are intended to be embraced within the ambit of the appended claims.

I claim:

1. In an information handling system, a matrix of magnetic cores of generally U-shaped configuration, means for positioning a perforated card in registry with said cores, keepers urged to seat on the open ends of said cores in registry with said perforations, said cores being grouped as word units in rows and columns, a row winding inductively coupled with each row of said cores, a columnar winding inductively coupled with the cores of each columnar group of word units, a read-out winding inductively coupled with each of the cores of said word units having a given digit place, means for applying a unidirectional pulse to one of said row windings to turn over the cores in the row to which said winding is inductively coupled from a first magnetic state to a second magnetic state of remanence, means for selectively applying a unidirectional pulse to one of said column windings after energization of said row winding to restore the cores of the word unit in the selected row and column to their original magnetic state, means for gating open said read-out windings simultaneously with restoration of said selected word unit to its original magnetic state, and means for returning all of said cores to their original state after the termination of the read-out gate.

2. A magnetic storage device comprising, in combination, a matrix including a plurality of interrogation lines intersecting a plurality of readout lines, means forming partial magnetic circuits around said intersections, means associated with each said partial magnetic circuit operable selectively in accordance with values assigned to said interrogation and said readout lines for completing said magnetic circuits, means for operating said selectively operable means, and means for pulsing said interrogation lines in a predetermined order whereby said readout lines are pulsed in accordance with values set up by said selectively operable means.

3. A magnetic storage device as defined in claim 2 including means for gating open a selected set of said read-out lines simultaneously with pulsing of said interrogation lines.

4. A magnetic storage device as defined in claim 2 wherein said magnetic circuits have opposite remanent states, and including means for turning over a group of said circuits from one magnetic state to the other before said interrogation lines are pulsed.

5. A magnetic storage device defined in claim 2 wherein said means forming partial magnetic circuits comprise a plurality of generally U-shaped magnetic cores, said means associated therewith comprise keepers for seating on the free ends of each core, and said operating means comprise means for urging said keepers through perforations in a perforated card for seating on the associated cores when said card is placed for registry of its perforations with said cores.

6. A magnetic storage device as defined in claim 2 wherein said means forming partial magnetic circuits comprise a matrix of open magnetic cores positioned for registry with corresponding row and column intersections of a card having a functional variation of perforations by row and column, said means associated therewith comprise keepers for seating on the free ends of each of said cores, and said operating means comprise means for independently biasing each of said keepers toward seated engagement with the free ends of the corresponding core when said card is positioned in registry with said cores to permit keepers registering with perforations to seat on associated cores.

7. A magnetic storage device as defined in claim 2 wherein said means forming partial magnetic circuits comprise an array of generally U-shaped magnetic cores arranged in rows and columns corresponding to the rows and columns of perforations of a perforated card, said means associated therewith comprise an array of keepers arranged for seating on the free ends of said cores, and said operating means comprise means for independently biasing each of said keepers toward seated engagement with the free ends of the corresponding core when said card is positioned with its perforations in registry with the cores and keepers.

8. A magnetic storage device as defined in claim 2 wherein said means forming partial magnetic circuits comprise a matrix of generally U-shaped magnetic cores arranged for reading a perforated card, said means associated therewith comprise a matrix of keepers spring-biased toward the respective free ends of associated cores, said matrices being arranged to receive a perforated card therebetween with its perforation in registry with selected cores, whereby said cores may be keepered.

9. A magnetic storage device as defined in claim 2 wherein said means forming partial magnetic circuits comprise a matrix of generally U-shaped magnetic cores, said means associated therewith comprise keepers for seating on the free ends of corresponding ones of said cores, further including means for positioning a perforated card with its perforations in registry with certain of said cores to prevent said keepers from seating on others of said cores, said pulsing means including drivers for respective energization of said interrogation lines and converter means for selectively energizing one of said drivers to derive a readout signal indicating the keepered and unkeepered states of cores inductively coupled with the interrogation line energized by said selected one of said drivers.

10. A magnetic storage device as defined in claim 2 wherein said means forming partial magnetic circuits comprise a matrix of generally U-shaped magnetic cores, said means associated therewith comprise keepers for selective seating on the corresponding free ends of said cores, further including means for positioning a perforated card with perforations in registry with certain of said cores, said pulsing means including a driver for each of said interrogation lines, and means for selectively energizing one of said drivers in response to a signal, further including means for gating open said readout lines when one of said drivers is energized.

11. A magnetic storage device as defined in claim 2 wherein said means forming partial magnetic circuits comprise a matrix of generally U-shaped cores spaced in fixed relation to one another with their free ends defining a common surface, said means associated therewith comprise a matrix of keepers spaced in correspondence with the spacing of said cores, and said operating means comprise means for moving said keepers selectively between a position removed from corresponding ones of said cores and a position for seating thereon, and means for resiliently urging each keeper toward both of the free ends of the corresponding core.

12. A magnetic storage device as defined in claim 2 further including a perforated card reading box comprising a base portion and a cover portion, said interrogation and readout lines being carried by said base portion, said means forming partial magnetic circuits comprising a matrix of generally U-shaped magnetic cores carried by said base portion in fixed relation to one another, said means associated therewith comprising an array of keepers carried by said cover portion for movement toward and away from said base portion with said keepers being spaced in correspondence with the spacing of said cores to seat on associated cores when moved toward said base portion.

13. A magnetic storage device as defined in claim 2 wherein said means forming partial magnetic circuits comprise a matrix of generally U-shaped magnetic cores, further including a plastic mass encapsulating said cores and lines for securely retaining the same in fixed relative position, said mass having a flat surface in the plane of the ends of said cores.

14. A magnetic storage device as defined in claim 2 wherein said partial magnetic circuits have two different states of permeability, said circuits being grouped to represent binary word units, said readout lines being arranged in a set to pass through each of said word units in accordance with the digit place of said circuits, whereby each winding of a set corresponds to a digit place, said pulsing means being arranged to inductively energize a plurality of said word units, and means for gating open the set of readout lines passing through a selected one of said energized word units.

15. A magnetic storage device as defined in claim 2 wherein said means forming partial magnetic circuits comprise a plurality of magnetic cores each having an air gap, said cores being grouped in rows as word units of the same digit places, said readout lines being arranged in a plurality of sets each set being inductively coupled to a columnar group of word units, said pulsing means being arranged to inductively energize a selected row of said cores, and means for selectively gating open one of said sets of readout lines simultaneously with energization of said selected row of cores.

16. A magnetic storage device as defined in claim 2 wherein said means forming partial magnetic circuits comprise magnetic cores grouped as word units in rows and columns, said interrogation lines passing through cores of word units grouped in a corresponding row, said readout lines being arranged in plural sets passing through cores in respective word unit columns, further including sets of coincidence units for selectively gating open one of said sets of readout lines, and a set of mixing units coupled to said sets of coincidence units to transmit readout signals induced on a gated set of said readout lines.

17. A magnetic storage device as defined in claim 2 wherein said means forming partial magnetic circuits comprise a matrix of magnetic cores arranged for selectively assuming either or two magnetic states, further including means for turning over a group of said cores from one magnetic state to the other, said pulsing means being arranged to turn over at least one core in said group to its original state, and means for deriving pulse signals from said readout lines dependent in value upon the completed condition of the core returned to its original state.

18. A magnetic storage device as defined in claim 17 wherein said cores are grouped as word units in rows and columns, said group of cores comprises a selected row thereof, said pulsing means is arranged to drive the cores in a selected column of word units toward said one state, and said signal deriving means is coupled by said readout lines with said cores in accordance with their digit place in said word units to derive a signal in binary from representing the pattern of magnetic circuit completion for the word unit in the selected row and column.

19. A magnetic storage device as defined in claim 2 wherein said means forming partial magnetic circuits comprises means forming partial magnetic cores, and said means associated therewith comprise manual means for completing said cores.

20. A magnetic storage device as defined in claim 2 wherein said interrogation lines have denominational designations and said readout lines have digital designations, said means forming partial magnetic circuits comprise means forming partial magnetic cores, said means associated therewith comprise keying means for completing said cores selectively in accordance with said digital and denominational designations, said pulsing means being arranged for pulsing said interrogation lines successively by denominational orders whereby said digital readout lines are pulsed in accordance with a multi-denominational number set up by said keying means.

21. A magnetic storage device as defined in claim 2 further comprising means for releasably retaining said operable means in its operated position.

22. A magnetic storage device as defined in claim 2 wherein said means forming partial magnetic circuits comprise a matrix of generally U-shaped magnetic cores spaced in fixed rows and columns, each of said cores being set at an angle to the rows and columns, said interrogation lines being straight and extending in fixed relation to the cores in each row for inductive coupling with the same, said readout lines being straight and extending in fixed relation to said cores in transverse relation to said interrogation lines, said cores having their free ends fixed in a common plane, and an additional conductor extending in fixed relation through said cores in at least two of said rows.

23. A magnetic storage device as defined in claim 22 wherein said additional conductor passes in a zig-zag pattern through successive rows of cores in a multiple column group.

(References on following page)

References Cited in the file of this patent

UNITED STATES PATENTS

| | | |
|---|---|---|
| 2,003,329 | Young | June 4, 1935 |
| 2,353,001 | Armbruster | July 4, 1944 |
| 2,457,403 | Sarver | Dec. 28, 1948 |
| 2,614,167 | Kamm | Oct. 14, 1952 |
| 2,691,154 | Rjachman | Oct. 5, 1954 |
| 2,724,103 | Ashenhurst | Nov. 15, 1955 |
| 2,734,187 | Rjachman | Feb. 7, 1956 |
| 2,782,989 | Knox | Feb. 26, 1957 |
| 2,814,031 | Davis | Nov. 19, 1957 |
| 2,931,014 | Buchholz et al. | Mar. 29, 1960 |

OTHER REFERENCES

Thesis on Magnetic Cores, by M. K. Haynes, Dec. 28, 1950, pages 21–28.